(12) United States Patent
Lin

(10) Patent No.: US 11,385,407 B2
(45) Date of Patent: Jul. 12, 2022

(54) COLORLESS SPLITTER BASED ON SOI PLATFORM

(71) Applicant: MARVELL ASIA PTE, LTD., Singapore (SG)

(72) Inventor: Jie Lin, Santa Clara, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 84 days.

(21) Appl. No.: 16/849,197

(22) Filed: Apr. 15, 2020

(65) Prior Publication Data

US 2021/0325606 A1    Oct. 21, 2021

(51) Int. Cl.

| G02B 6/125 | (2006.01) |
|---|---|
| G02B 6/122 | (2006.01) |
| G02B 6/126 | (2006.01) |
| G02B 6/13 | (2006.01) |
| G02B 6/14 | (2006.01) |
| G02B 6/12 | (2006.01) |

(52) U.S. Cl.
CPC .......... G02B 6/125 (2013.01); G02B 6/1228 (2013.01); *G02B 6/126* (2013.01); *G02B 6/13* (2013.01); *G02B 6/14* (2013.01); *G02B 2006/1215* (2013.01)

(58) Field of Classification Search
None
See application file for complete search history.

(56) References Cited

U.S. PATENT DOCUMENTS

| 7,391,948 B2 * | 6/2008 | Kempen | G02B 6/1228 385/130 |
|---|---|---|---|
| 9,523,820 B1 * | 12/2016 | Vermeulen | G02B 6/126 |
| 9,547,127 B1 * | 1/2017 | Lin | G02B 6/2804 |
| 9,557,485 B2 * | 1/2017 | Kojima | G02B 6/126 |

(Continued)

FOREIGN PATENT DOCUMENTS

| CN | 107076928 A * | 8/2017 | G02B 6/1228 |
|---|---|---|---|
| CN | 2017504830 A * | 9/2017 | G02B 6/1228 |

(Continued)

OTHER PUBLICATIONS

Kobayashi et al. (Photonics In Switching, Chapter 10 "Guided-wave Optical Interconnect Techniques", 1993, Academic Press, Inc., pp. 271-317). (Year: 1993).*

(Continued)

*Primary Examiner* — Michelle R Connelly

(57) ABSTRACT

An optical splitter includes a silicon-on-insulator substrate having a cladding layer. The optical splitter also includes a first waveguide of a first width and a first length buried in the cladding layer and a second waveguide of a second width and a second length buried in the cladding layer disposed in close proximity of the first waveguide by a gap distance. A ratio of the second width over the first width is configured to be smaller than 1 while the first length, the second length, and the gap distance are configured to allow evanescent coupling of a first confined mode of an optical signal in the first waveguide into the second waveguide with a certain splitting ratio being achieved in a range of 1% to <50% substantially unchanged over a broadband of wavelengths.

16 Claims, 5 Drawing Sheets

(56) References Cited

U.S. PATENT DOCUMENTS

| | | | | |
|---|---|---|---|---|
| 2004/0240770 A1* | 12/2004 | Junnarkar | ............... | G02B 6/126 |
| | | | | 385/14 |
| 2008/0025665 A1* | 1/2008 | Little | ..................... | G02B 6/126 |
| | | | | 385/30 |
| 2013/0223791 A1* | 8/2013 | Okayama | ............... | G02B 6/354 |
| | | | | 385/16 |
| 2015/0104130 A1* | 4/2015 | Anderson | ............ | G02B 6/1228 |
| | | | | 385/28 |

FOREIGN PATENT DOCUMENTS

| | | | | |
|---|---|---|---|---|
| CN | 108594364 B | * | 11/2019 | ............... G02B 6/12 |
| EP | 2924482 B1 | * | 12/2017 | ........... G02B 6/1228 |
| JP | 6198091 B2 | * | 9/2017 | ............... G02B 6/14 |
| JP | 6342651 B2 | * | 6/2018 | ......... G02B 6/12007 |
| WO | WO-02075396 A2 | * | 9/2002 | ............ G02B 6/2552 |
| WO | WO-2017169922 A1 | * | 10/2017 | ............. G02B 6/122 |

OTHER PUBLICATIONS

Luo et al. ("Integrated dual-mode 3 dB power coupler based on tapered directional coupler", Scientific Reports, www.nature.com/scientificreports, Mar. 22, 2016). (Year: 2016).*

Sadun, Allan Elvio, ("Robust design algorithms for silicon photonics", Massachusetts Institute of Technology, 2019). (Year: 2019).*

\* cited by examiner

1x2 splitter

COLORLESS SPLITTER BASED ON SOI PLATFORM

BACKGROUND OF THE INVENTION

The present invention relates to a silicon-photonics device. More particularly, the present invention provides a colorless optical splitter based on silicon-on-insulator (SOI) platform, a method of making the same, and a silicon-photonics circuit integrated with the colorless optical splitter for broad band communication in Dense Wavelength Division Multiplexing (DWDM) or Coarse Wavelength Division Multiplexing (CWDM) system.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Large-scale photonic integrated circuits are becoming very promising for many applications, including next-generation optical networks, optical interconnects, dense wavelength division multiplexed (DWDM) systems, coherent transceivers, lab-on-chip, etc. Silicon-based photonics integrated circuits have also become very popular, because of their compatibility with mature CMOS (complementary metal-oxide-semiconductor) technologies with excellent processing control, low cost and high-volume processing. Furthermore, silicon-on-insulator (SOI) is widely used as substrates for making various silicon-photonics devices. It is well known that SOI-based waveguides are usually severely polarization-sensitive so that many polarization handling devices including broad-band colorless splitter have become very important components in silicon photonics integrated circuit (SPIC).

For example, a compact optical splitter made on SOI substrate by simple process with high fabrication tolerance is desired to be integrated with other silicon-photonics devices and used as a crucial component for SPIC-based DWDM or CWDM system working in C-band or O-band. Prior approaches of making the optical splitter for silicon-photonics integrated circuit are mostly process intolerant, wavelength dependent over a broad band, fabrication sensitive, dimension sensitive, and hard to be integrated with other silicon-photonics devices.

Therefore, it is desired to develop improved compact, process-robust, colorless optical splitter for easy integration in silicon-photonics circuits for broad-band DWDM and CWDM application.

BRIEF SUMMARY OF THE INVENTION

The present invention relates to a silicon-photonics device. More particularly, the present invention provides a colorless optical splitter based on silicon-on-insulator (SOI) platform, a method of making the same, and a silicon-photonics circuit integrated with the colorless optical splitter for broad-band communication in DWDM or CWDM system, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides an optical splitter. The optical splitter includes a silicon-on-insulator substrate having a cladding layer. The optical splitter additionally includes a first waveguide of a first width and a first length buried in the cladding layer. Furthermore, the optical splitter includes a second waveguide of a second width and a second length buried in the cladding layer disposed in close proximity of the first waveguide by a gap distance. A ratio of the second width over the first width is configured to be smaller than 1 while the first length, the second length, and the gap distance are configured to allow evanescent coupling of a first confined mode of an optical signal in the first waveguide into the second waveguide with a certain splitting ratio being achieved in a range of 1% to <50% substantially unchanged over a broadband of wavelengths.

In an alternative embodiment, the present invention provides a method for making a colorless optical splitter. The method includes providing a silicon-on-insulator substrate having a cladding layer. Additionally, the method includes forming a first waveguide of a first width and a first length buried in the cladding layer. Furthermore, the method includes forming a second waveguide of a second width and a second length buried in the cladding layer disposed in close proximity of the first waveguide by a gap distance. Moreover, the method includes configuring a ratio of the second width over the first width to keep it smaller than 1 while configuring the first length, the second length, and the gap distance to allow evanescent coupling of a first confined mode of an optical signal in the first waveguide into the second waveguide with a certain splitting ratio being achieved in a range of 1% to <50% substantially unchanged over a broadband of wavelengths.

Many benefits of the optical splitter can be achieved with the present invention based on SOI platform. As an example, the SOL platform is fully compatible with CMOS technology, which substantially simplifies the process of making the optical splitter itself as well as integrating it with other silicon-photonics devices. High fabrication tolerance in material selection and feature dimensions allow a simple manufacture process to make the optical splitter based on SOI substrate. By a novel design of using evanescent coupling mechanism, the optical splitter can be made as fully colorless splitter for broad band like C-band at least from 1530 nm to 1570 nm or O-band at least from 1270 nm to 1330 nm, which is substantially advantageous for DWDM and CWDM applications.

The present invention achieves these benefits and others in the context of disclosed colorless optical splitter based on SOI substrate. A further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to a silicon-photonics device. More particularly, the present invention provides a colorless optical splitter based on silicon-on-insulator (SOI) platform, a method of making the same, and a silicon-photonics circuit integrated with the colorless optical splitter for broad-band communication in Dense Wavelength Division Multiplexing (DWDM) system, though other applications are possible.

Figure 1:
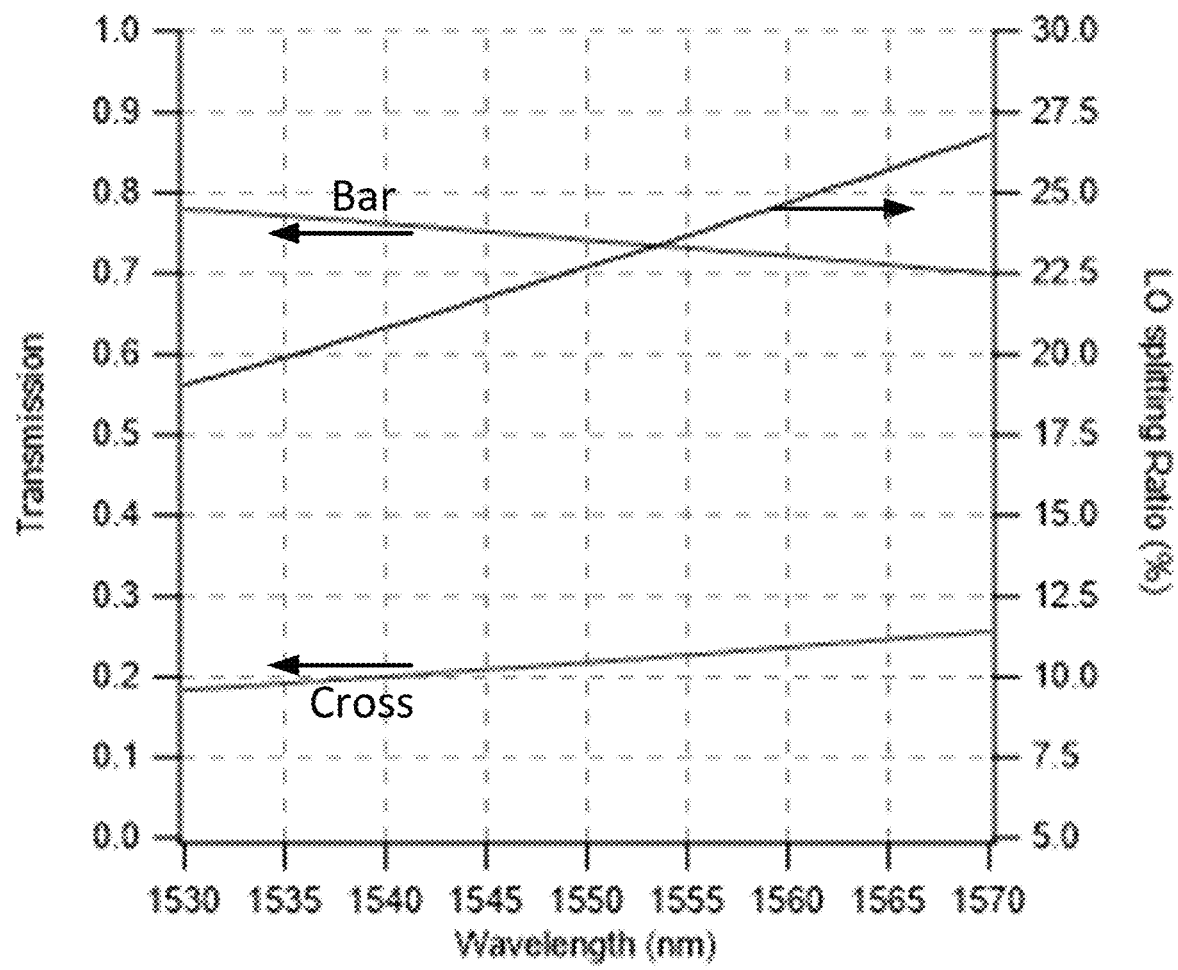
FIG. 1 is an example of a related art of a traditional directional coupler with two equal-width waveguides with certain gap and its optical splitting performance.
Figure 1:
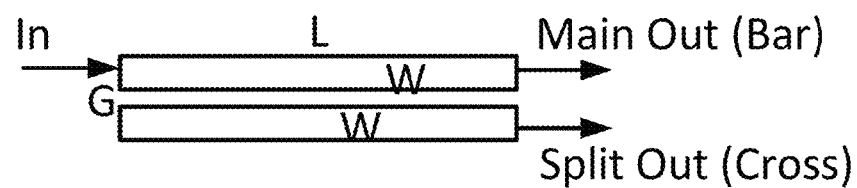

Compact, process-tolerant optical splitter based on silicon-on-insulator (SOI) substrate is a crucial element for implementing broad-band Dense Wavelength Division Multiplexing (DWDM) light wave transmission through silicon-photonics integrated circuit (SPIC). Traditional directional coupler formed from two equal-width waveguides with certain gap distance can be used as the optical splitter. FIG. 1 shows an example of a traditional directional coupler with two equal-width waveguides with certain gap and its optical splitting performance as a 20:80 splitter. As shown, the broadband splitting ratio of the designated 20:80 splitter shows clear wavelength dependence to vary from 0.78 at 1530 nm 0.7 at 1570 nm. The splitting ratio largely is relied on controlling the gap distance G between two waveguides with a selection of a length L and W for each of them. It is known that the optical performance is quite sensitive to the gap dimension which is as small as a few microns, making it a highly fabrication-intolerant device.

Several variations or modifications of the directional coupler include adiabatic tapered directional coupler. However, the length of the adiabatic tapered directional coupler is long and still is highly fabrication sensitive, making it not suitable for being integrated in SPIC. Another alternate design is grating assisted directional coupler. Yet, its complicate design and fabrication sensitive nature make it not a good candidate for large-scale application in optical communication system based on SPICs. Similarly, a segmented directional coupler also has long (>100 µm) body length and its performance is very fabrication sensitive.

Figure 2:
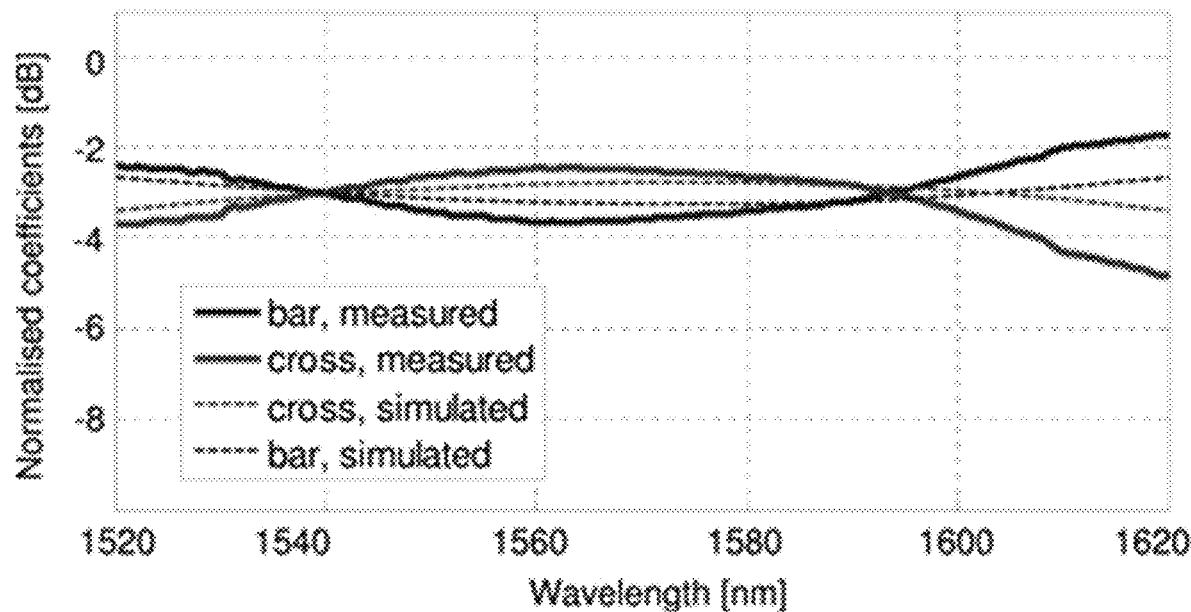
FIG. 2 is another example of a related art of a traditional directional coupler with two equal-width waveguides with certain gap in bending design and its optical splitting performance.
Figure 2:
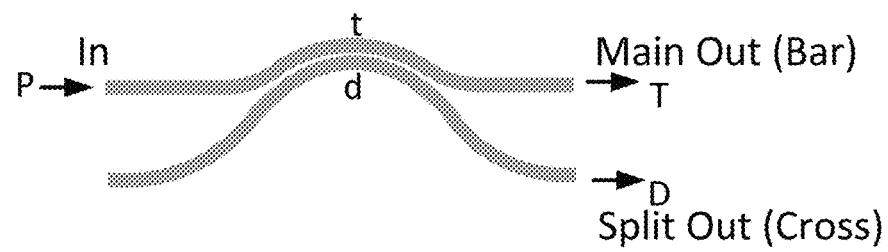

FIG. 2 shows another example of a related art of a traditional directional coupler with two equal-width waveguides with certain gap in bending design and its optical splitting performance. As shown, the direction coupler with two equal-width waveguides adopts a bending design using a combination of straight and curved sections based on the silicon-on-insulator platform to reduce overall length while achieving broadband optical splitting. An optical signal with power P is received at the input port In of a first waveguide t which is in close proximity of a second waveguide d, both are bent with optimized feature dimension or curvature to yield a desired splitting ratio so that a split portion of the optical power is coupled from the first waveguide t into the second waveguide d. A major portion of the power P of the optical signal is outputted from a main output T (or Bar output) of the first waveguide t and a minor portion of the power P of the optical signal is outputted from a split output D (or Cross output) of the second waveguide d. the bending design determines the splitting ratio of the optical power. However, the bending design introduces more challenge on fabrication and the splitting ratio still has fairly large wavelength dependence (with >2 dB loss variation) over a broad range from 1520 nm to 1580 nm and beyond.

This invention provides a compact, fabrication tolerant, and substantially wavelength-independent broad-band optical splitter based on silicon-on-insulator platform for integration with silicon-photonics integrated circuits. The fabrication process of two non-equal-width waveguides in a cladding of a silicon-on-insulator (SOI) substrate is substantially within the scope of standard CMOS process and the optical performance is insensitive to key feature dimensions. The achieved splitting ratio can be any value between 1% to <50% and substantially wavelength independent for a wide range of wavelengths, making it a perfect broad band optical splitter. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, end, top, bottom, forward, reverse, up, down, side, vertical, lateral, clockwise and counter-clockwise have been used for convenience purposes only and are not intended to imply any particular fixed direction. Instead, they are used to reflect relative locations and/or directions between various portions of an object.

Figure 3:
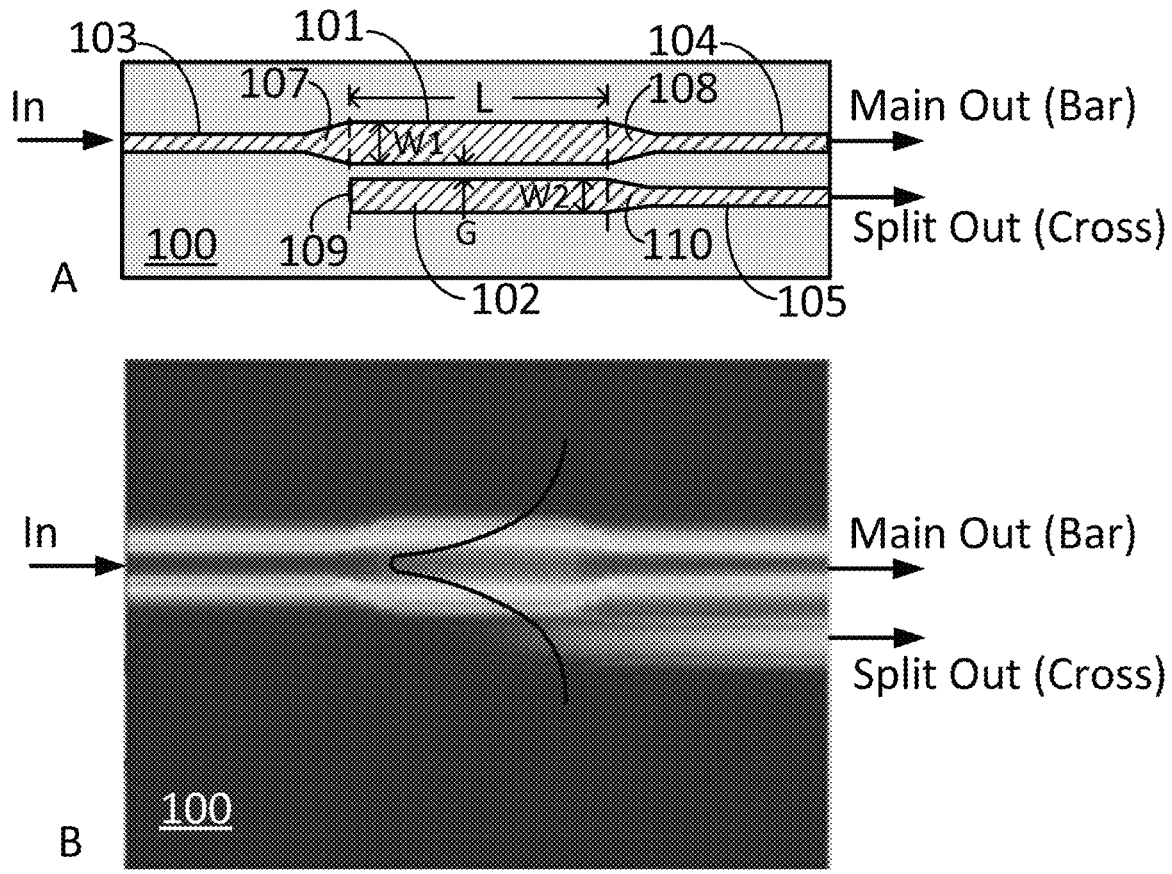
FIG. 3 is a schematic diagram of an 1×2 20:80 optical splitter based on SOI platform and its optical splitting performance according to an embodiment of the present disclosure.
Figure 3:
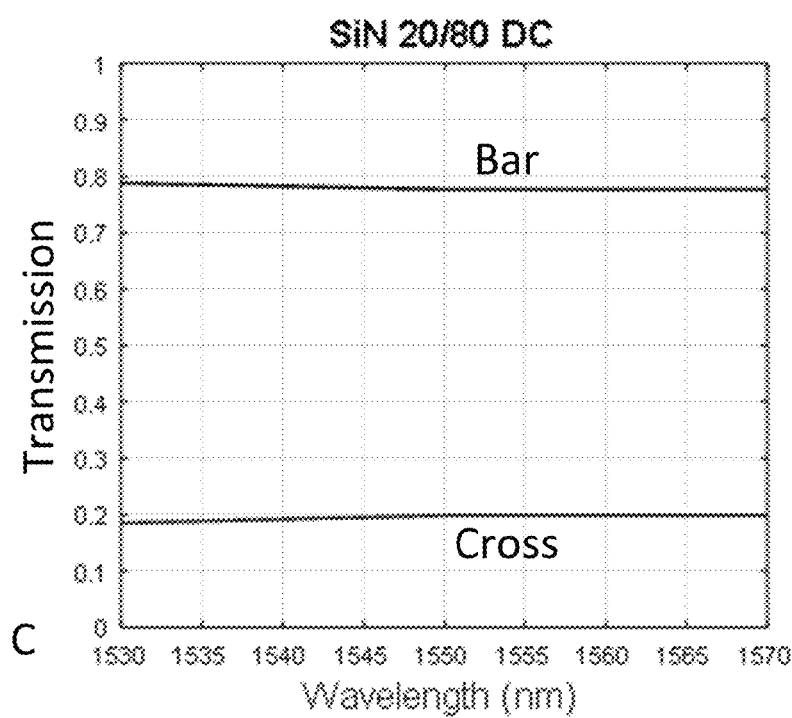
Figure 4:
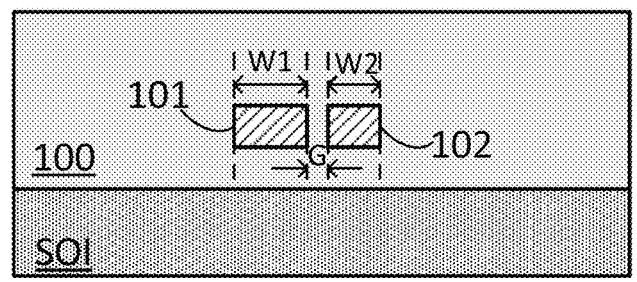
FIG. 4 is a cross-sectional view of the optical splitter based on the SOI platform according to an embodiment of the present disclosure.

FIG. 3 is a schematic diagram of an 1×2 20:80 optical splitter based on SOI platform and its optical splitting performance according to an embodiment of the present disclosure. This diagram is merely an example, which should not unduly limit the scope of the claims. One of ordinary skill in the art would recognize many variations, alternatives, and modifications. As shown in part A of the figure, an 1×2 optical splitter includes two waveguides, a first waveguide 101 and a second waveguide 102, disposed in close proximity with a gap distance G in a cladding layer 100 on a silicon-on-insulator (SOI) substrate (not directly viewable). FIG. 4 also shows, in an embodiment, a rectangular cross section of the two waveguides buried in the cladding layer 100 on the SOI substrate. In an embodiment, in a top view seen in the part A of the figure, the first waveguide 101 and the second waveguide 102 are formed in substantially rectangular shape with a length L measured from a first end to a second end and two different widths W1 and W2 respectively, and be parallel to each other along the length direction separated from each other by a narrow gap G. Optionally, the first waveguide 101 may have a first length L1 and the second waveguide 102 has a second length L2. Optionally, the second length L2 is set to be substantially the same as the first length L1, or L2=L1=L. In the embodiment, the first waveguide 101 includes a first taper region 107 at the first end to couple with an input waveguide 103 and a second taper region 108 at the second end to couple with a main output waveguide 104. Both the input waveguide and the main output waveguide have a smaller width than the first width W1. The second waveguide 102 includes a first end 109 being terminated and a taper region 110 at the second end to couple with a split output waveguide 105 which has a smaller width than the second width W2.

Referring to part A of FIG. 3 and FIG. 4, both the first waveguide 101 and the second waveguide 102 as well as the input waveguide 103, the main output waveguide 104, and the split output waveguide 105 are totally buried in a cladding layer 100 on the SOI substrate. In an embodiment, both the first waveguide 101 and the second waveguide 102 are made from silicon nitride material having a relatively large refractive index and the cladding layer 100 is made from silicon oxide material having a relatively small refractive index. So do the input waveguide 103, the main output waveguide 104, and the split output waveguide 105 have the same silicon nitride material. Optionally, other semiconducting materials with relatively large refractive indices can also be used to make the first waveguide 101 and the second waveguide 102. The refractive index difference between the waveguide and the cladding layer allows a transverse light wave to be confined within the waveguide. The process of fabricating the two waveguides buried in the cladding layer 100 is fully compatible with general CMOS process performed for forming various photonics elements including various waveguides based in the SOI platform. In an embodiment as shown in FIG. 4, the second waveguide 102 is disposed in close proximity of the first waveguide 101 with a small gap distance G. In an embodiment, the two waveguides are disposed in a same level laterally with a gap distance. In an alternative embodiment, the two waveguides are disposed in a same vertical line with a gap distance. In another embodiment, the two waveguides are disposed in an arbitrary angle with a gap distance. though actual process for forming the two waveguides in a same level laterally may be preferable for convenience and cost saving.

The two waveguides 101 and 102 configured as seen in part A of FIG. 3 lead to a 1×2 splitter. Optionally, any of the input waveguide 103, the main output waveguide 104 and the split output waveguide 105 is configured to be coupled with waveguides in silicon photonics integrated circuits in various optical and opto-electrical communication applications including silicon-photonics-based broadband DWDM or CWDM communication system. Assuming an optical signal is received by the input waveguide 103 and transmitted through the first waveguide 101 before being outputted via the main output waveguide 104, the optical signal is a transverse wave having multiple modes being confined within the rectangular shaped first waveguide 101 buried in the cladding material. A first confined mode is shown in part B of FIG. 3. Although a major portion of optical power of the first confined mode is included in the interior region of the first waveguide 101, a portion of evanescent tail of the mode is extended out of the nearby region outside the first waveguide 101. In the embodiment, the second waveguide 102 is disposed in close proximity of the first waveguide 101 within the nearby region as mentioned so that the evanescent tail of the first confined mode can be coupled into the second waveguide 102. Optionally, the second width W2 of the second waveguide 102 is made different from the first width W1 of the first waveguide 101. Although the lengths (and heights) of the two waveguides are usually made to be the same to simplify the fabrication process, the different widths result in different propagation constant associated with the two waveguides. Therefore, the modes in the two waveguides does not beat with each other, allowing a stable coupling of the optical power of the optical signal from the first waveguide 101 into the second waveguide 102 with a certain splitting ratio. For example, as shown in part C of FIG. 3, the split output (Cross) outputs about 20% of the power while the main output (Bar) outputs about 80% of the power. Note, the 20:80 splitting ratio is a substantially colorless constant, i.e., independent from wavelengths, over a broad band of at least 1530 nm to 1570 nm.

In an embodiment, the splitting ratio is determined by the evanescent coupling which is set by keeping a width ratio W2/W1 of the two waveguides to a value smaller than 1 and configuring the length L of them and their gap distance G during the fabrication process of the 1×2 splitter as shown in part A of FIG. 3. Arbitrary value of the splitting ratio can be designed by engineering the feature dimensions as mentioned. Optionally, a splitting ratio of 1% can be designed. Optionally, a splitting ratio of any value smaller than 50% can be designed. In an embodiment, as the width ratio is optimized, the splitting ratio is substantially saturated as the length L is increased and the gap distance G is reduced. In other words, the length L of the 1×2 splitter can be optimized with a small length to make it as compact as possible, yet the gap distance G becomes an insensitive factor when it is small enough to make the fabrication tolerant. Optionally, the 1×2 splitter is compact with a length being limited in 3 μm-20 μm depending on the splitting ratio. Optionally, the gap distance G between the two waveguides is substantially smaller than 2 mm but is an insensitive factor to determining a certain value of the splitting ratio.

In an alternative embodiment, the same evanescent coupling effect can be applied to design a colorless splitter for operation in O-band at least from 1270 nm to 1330 nm for a variety of splitting ratios ranging from 1% to <50%.

Figure 5:
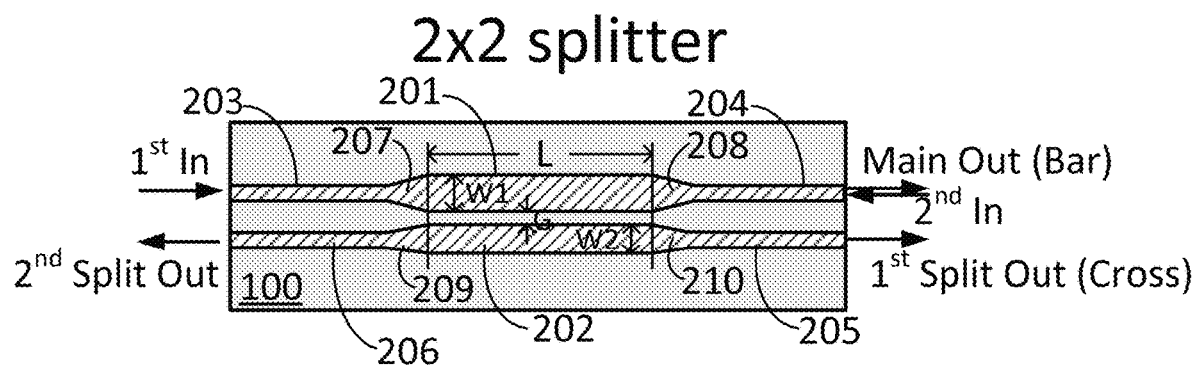
FIG. 5 is a schematic diagram of an optical splitter based on SOI platform in 2×2 bi-directional scheme according to another embodiment of the present disclosure.

FIG. 5 a schematic diagram of an optical splitter based on SOI platform in 2×2 bi-directional scheme according to another embodiment of the present disclosure. This diagram is merely an example, which should not unduly limit the scope of the claims. One of ordinary skill in the art would recognize many variations, alternatives, and modifications. In an embodiment, the optical splitter based on the SOI platform can be designed to a 2×2 splitter for bi-directional operation. As shown, the 2×2 splitter, similar to the 1×2 splitter shown in FIG. 3, includes a first waveguide 201 of a length L and a width W1 and a second waveguide 202 of a length substantially the same as L and a different width W2 disposed parallelly with a gap distance G in close proximity to the first waveguide 201. Optionally, the second width W2 is designed to be smaller than the first width W1 for utilizing evanescent coupling effect to optimally engineering a variety of desired splitting ratios ranging from 1% to <50%.

The first waveguide 201 and the second waveguide 202 have substantially the same length L between a first end and a second end. The first waveguide 201 includes a first taper region 207 at the first end coupled to a first input waveguide 203 and a second taper region 208 at the second end coupled to a main out waveguide 204. The main out waveguide serves a bar output with a major portion of power of an optical signal received from the first input waveguide 203 ($1^{st}$ In). The second waveguide 202 includes a first taper region 209 at the first end coupled to a second split out waveguide 206 and a second taper region 210 coupled to a first split out waveguide 205. The first split out waveguide 205 is configured to output a minor portion of power of an optical signal received from the first input waveguide 203. The second split out waveguide 206 is configured to output a minor portion of power of an optical signal traveling in opposite direction received from the main out waveguide 204. Thus, the 2×2 splitter serves a bi-directional optical splitter. The minor portion of power outputted in either the first split out waveguide or the second split out waveguide is basically determined by the splitting ratio designed within the 2×2 splitter by configuring feature dimensions including the ratio of W2/W1, the length L, and the gap distance G.

Figure 6:
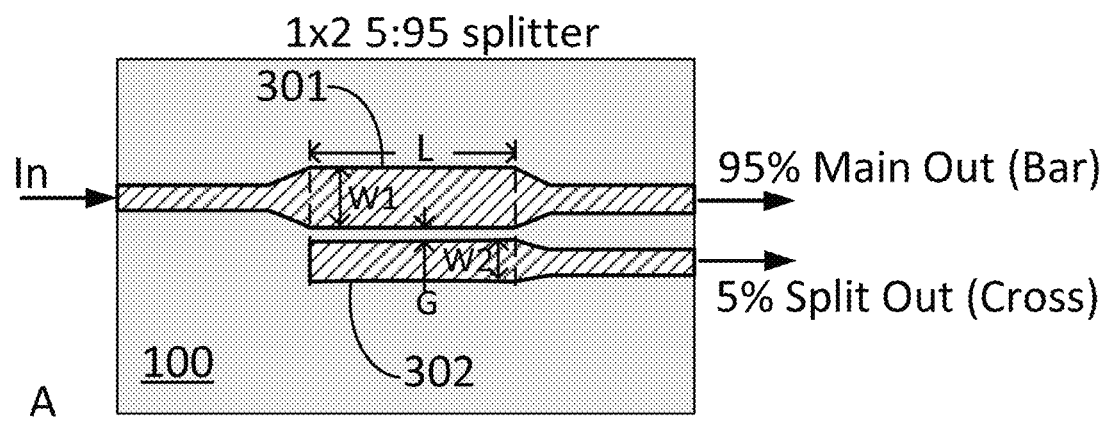
FIG. 6 is an exemplary diagram of an 1×2 5:95 optical splitter based on SOI platform and its optical splitting performance according to some alternative embodiments of the present disclosure.
Figure 6:
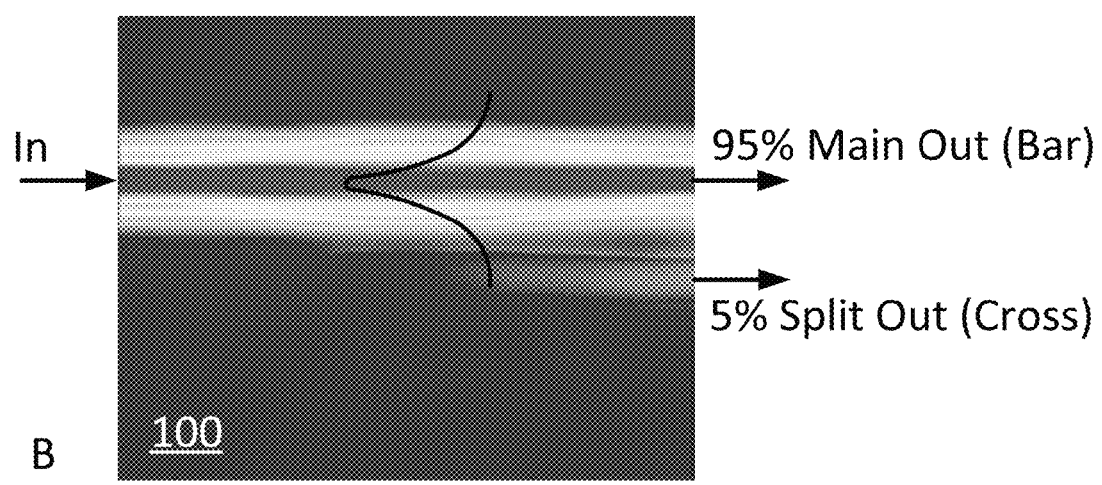
Figure 6:
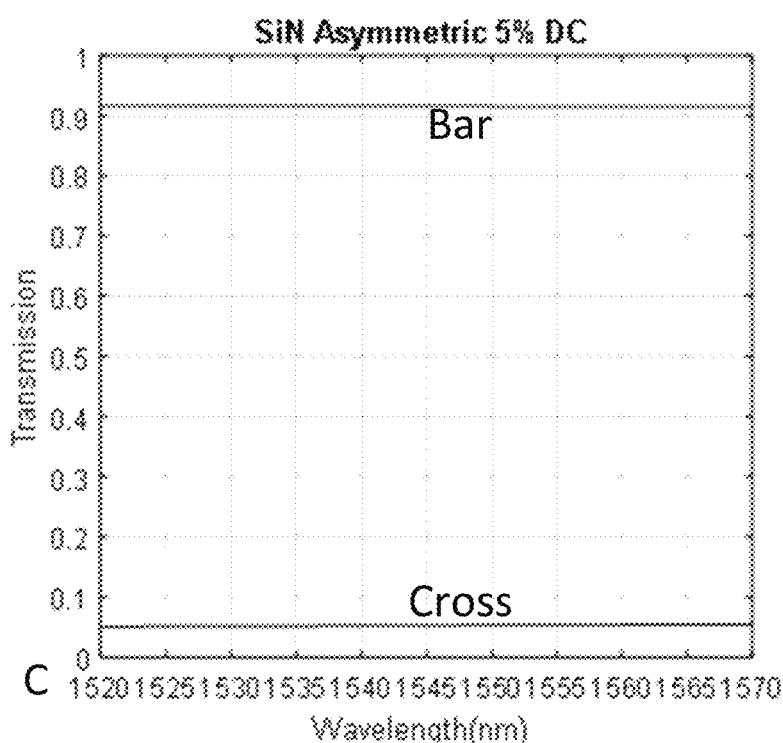

FIG. 6 is an exemplary diagram of an 1×2 5:95 optical splitter based on SOI platform and its optical splitting performance according to some alternative embodiments of the present disclosure. This diagram is merely an example, which should not unduly limit the scope of the claims. One of ordinary skill in the art would recognize many variations, alternatives, and modifications. Referring to part A of FIG. 6, the 1×2 5:95 optical splitter is made by two waveguides, 301 and 302, having a same coupling length L and two different width W1 and W2 and disposed in parallel in close proximity with a small gap distance G. The 5:95 splitting ratio is substantially determined by controlling feature dimensions including an optimum width ratio of W2/W1<1 and optimum length L and gap G to couple only the evanescent tail of a first confined mode from the first waveguide 301 to the second waveguide 302, as seen in part B of FIG. 6. The different propagation constant between the two waveguides 301 and 302 due to different widths W1 and W2 ensures that the modes in the two waveguides do not beat each other. The 5:95 splitting ratio is substantially saturated as the length L and the gap G approach certain optimum values respectively once an optimum ratio of two widths (W2/W1<1) is provided during the fabrication process for forming the 1×2 5:95 splitter. As shown in part C of FIG. 6, the splitting ratio is substantially stable constant over a wide range of wavelengths as the major portion of light transmission through the 95% main out (Bar output) and the minor portion of light transmission through the 5% split out (Cross output) are all independent from the wavelength changes from 1520 nm to 1570 nm. The wavelength-independent splitting ratio makes the splitter a colorless optical splitter which is best suitable for a broadband operation in typical DWDM communication system.

In a specific embodiment, for forming a splitter with highly asymmetric splitting ratio the length L tends to be optimized in a smaller value, comparing to a splitting ratio closer to 50%. The gap distance tends to be optimized in a larger value to have less evanescent coupling. Yet, gap distance G and the length are fairly insensitive to achieve a certain splitting ratio, making the fabrication process quite robust and facilitating to have this splitter being integrated in silicon-photonics integrated circuits which are widely implanted in broadband DWDM or CWDM opto-electrical communication application.

In another aspect, the present disclosure provides a method of making a colorless optical splitter based on silicon-on-insulator (SOI) platform. Referring to FIG. 3 and FIG. 4, the method includes providing a SOI substrate having a cladding layer. The SOI substrate is commonly used for fabrication silicon-photonics devices for integration of SPICs for applications including data communication in a broad band DWDM or CWDM system. Particularly, optical splitter is a widely used passive device in the broad band DWDM or CWDM system. Additionally, the method includes a process of forming a first waveguide of a first width and a first length buried in the cladding layer and a process for forming a second waveguide of a second width and a second length buried in the cladding layer disposed in close proximity of the first waveguide by a gap distance. These processes are fully compatible to existing CMOS-based process for making silicon-photonics circuits on the SOI substrate without complicate waveguide engineering. The first waveguide and the second waveguide may be conveniently formed in a same level laterally and in parallel to each other. Optionally, the first waveguide and the second waveguide are made with SiN or other materials with relatively high refractive indices. Optionally, the cladding layer is made with silicon oxide material with relatively small refractive index.

In an embodiment, the method is implemented by a process of configuring a ratio of the second width over the first width to keep it smaller than 1 while configuring the first length, the second length, and the gap distance to allow evanescent coupling of a first confined mode of an optical signal in the first waveguide into the second waveguide with a certain splitting ratio being achieved in a range of 1% to <50% substantially unchanged over a broadband of wavelengths. Optionally, each of the first waveguide and the second waveguide is formed as rectangular shape having a rectangular cross section. Optionally, the first length and the second length are made equal for process convenience. Optionally, the first waveguide is formed with two tapered regions at its two ends respectively coupled to an input waveguide and a main output waveguide having a width smaller than the first width. Optionally, the second waveguide is formed with at least one tapered region coupled to a first split output waveguide having a width smaller than the second width. Optionally, the length and the gap distance are configured to yield a saturated value of a splitting ratio as the ratio of the second width over the first width is set to an optimized value. Optionally, the splitting ratio is measurable by introducing an optical signal of a certain power to the input waveguide of the first waveguide and measuring a major portion of power being outputted to the main output waveguide and a minor portion of power being outputted to the first split output waveguide. Optionally, the optical signal can be provided from a wavelength tunable source so that the splitting ratio can be recorded for a broad band of wavelengths such as a C-band at least from 1530 nm to 1570 nm or an O-band at least from 1270 nm to 1330 nm.

In an embodiment, the process of forming of the first waveguide and the second waveguide includes forming the two waveguides in parallel to each other with rectangular shaped cross sections having a same height using a silicon nitride material buried in a cladding layer using a silicon oxide material. Optionally, the two waveguides are formed in a same level laterally.

In the embodiment, the process of configuring the first length, the second length, and the gap distance comprises optimizing the length and gap distance under an optimized ratio of the second width over the first width to have the certain splitting ratio to reach a saturate value as the length is finalized with a value smaller than 25 mm and the gap distance is finalized with a value smaller than 2 μm.

In yet another aspect, the present disclosure provides a silicon-photonics circuit for broad band DWDM or CWDM communication system containing colorless optical splitter based on SOI platform. Optionally, the silicon-photonics circuit includes passive components like multiplexer or demultiplexer, optical coupler, optical splitter, etc. Optionally, the silicon-photonics circuit includes components like modulator, phase shifter etc. that are coupled to active devices (laser or photodetector) for transmitting or receiving optical signals with broad band of wavelengths. Optionally, the broad band can be a C-band from 1525 nm to 1575 nm, or at least from 1530 nm to 1570 nm. Optionally, the broad band can be an O-band at least from 1270 nm to 1330 nm. The colorless optical splitter described herein can be optimized to have an arbitrary splitting ratio ranging from 1% to <50% for splitting a certain portion of light wave for all wavelengths in the C-band or O-band in the first waveguide to a second waveguide. Optionally, the splitting ratio is substantially constant independent from the wavelengths in the entire broad band. Optionally, the colorless optical splitter can be configured to be a 1×2 uni-directional device or a 2×2 bi-directional device for different applications. Optionally, the colorless optical splitter has a compact size that can be easily integrated in the silicon-photonics circuit for achieve compact module design and high capacity for high-speed data communication applications.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical splitter comprising:
   a silicon-on-insulator substrate having a cladding layer;
   a first waveguide of a first width and a first length buried in the cladding layer;
   a second waveguide of a second width and a second length buried in the cladding layer, the second waveguide disposed parallel to the first waveguide and separated from the first waveguide by a predetermined distance;
   a first tapered region extending from a first end of the first waveguide;
   an input waveguide of a third width buried in the cladding layer to receive an optical signal, the input waveguide extending from the first tapered region, the third width being less than at least one of the first and second widths;
   a second tapered region extending from a second end of the first waveguide;
   a first output waveguide of a fourth width buried in the cladding layer, the first output waveguide extending from the second tapered region to output a major portion of the optical signal, the fourth width being less than at least one of the first and second widths;
   a third tapered region extending from one end of the second waveguide, the third tapered region being on the same side as the second tapered region, the other end of the second waveguide being terminated; and
   a second output waveguide of the fourth width buried in the cladding layer, the second output waveguide extending from the third tapered region to output a minor portion of the optical signal, the second output waveguide being parallel to the first output waveguide;
   wherein the first waveguide, the first and second tapered regions, the input waveguide, and first output waveguide are collinear;
   wherein the second waveguide, the third tapered region, and the second output waveguide are collinear;
   wherein a ratio of the second width to the first width is less than 1; and
   wherein the first length, the second length, and the predetermined distance are configured to allow evanescent coupling of the optical signal in the first waveguide into the second waveguide with a predetermined splitting ratio over a broadband of wavelengths in C band or O band, the minor portion and the major portion being determined by the predetermined splitting ratio.

2. The optical splitter of claim 1, wherein both the first waveguide and the second waveguide comprise silicon nitride material.

3. The optical splitter of claim 1, wherein the cladding layer comprises silicon oxide material.

4. The optical splitter of claim 1, wherein the second length is substantially equal to the first length.

5. The optical splitter of claim 1, wherein the predetermined splitting ratio is substantially independent of all wavelengths over C-band.

6. The optical splitter of claim 1, wherein the predetermined splitting ratio is substantially independent of all wavelengths over O band.

7. The optical splitter of claim 1, wherein each of the first waveguide and the second waveguide comprises a rectangular shaped cross section.

8. The optical splitter of claim 1, wherein the first width is larger than a width of each of the input waveguide and the first output waveguide.

9. The optical splitter of claim 1, wherein the second width is larger than a width of the first output waveguide.

10. The optical splitter of claim 1, wherein the predetermined distance is selected to saturate the predetermined splitting ratio.

11. The optical splitter of claim 1, wherein the predetermined splitting ratio is in a range from 1% to <50% and is substantially independent of all wavelengths over C-band or O-band.

12. An optical splitter comprising:
   a silicon-on-insulator substrate having a cladding layer;
   a first waveguide of a first width and a first length buried in the cladding layer, the first waveguide comprising first and second tapered regions at first and second ends, respectively;
   a second waveguide of a second width and a second length buried in the cladding layer, the second waveguide disposed proximate to the first waveguide and separated from the first waveguide by a predetermined distance;

an input waveguide of a third width buried in the cladding layer to receive an optical signal, the input waveguide being collinear with the first waveguide and coupled to the first tapered region of the first waveguide, the third width being less than at least one of the first and second widths; and an output waveguide of a fourth width buried in the cladding layer, the output waveguide being collinear with the first waveguide and coupled to the second tapered region of the first waveguide to output a major portion of the optical signal, the fourth width being less than at least one of the first and second widths;

wherein a ratio of the second width to the first width is less than 1;

wherein the first length, the second length, and the predetermined distance are configured to allow evanescent coupling of the optical signal in the first waveguide into the second waveguide with a predetermined splitting ratio over a broadband of wavelengths in C band or O band; and wherein the second waveguide comprises third and fourth tapered regions at first and second ends of the second waveguide, respectively; the third and fourth tapered regions being coupled to first and second split output waveguides, respectively; the first split output waveguide outputting a first minor portion of the optical signal received in reversed direction from the output waveguide; and the second split output waveguide outputting a second minor portion of the optical signal received from the input waveguide, the first and second minor portions and the major portion being determined by the predetermined splitting ratio.

13. An optical splitter comprising:
a silicon-on-insulator substrate having a cladding layer;
a first waveguide of a first width and a first length buried in the cladding layer;
a second waveguide of a second width and a second length buried in the cladding layer, the second waveguide disposed parallel to the first waveguide and separated from the first waveguide by a predetermined distance;
a first tapered region extending from a first end of the first waveguide;
an input waveguide of a third width buried in the cladding layer to receive an optical signal, the input waveguide extending from the first tapered region, the third width being less than at least one of the first and second widths;
a second tapered region extending from a second end of the first waveguide;
a first output waveguide of a fourth width buried in the cladding layer, the first output waveguide extending from the second tapered region to output a major portion of the optical signal, the fourth width being less than at least one of the first and second widths;
a third tapered region extending from one end of the second waveguide, the third tapered region being on the same side as the second tapered region, the other end of the second waveguide being terminated; and
a second output waveguide of the fourth width buried in the cladding layer, the second output waveguide extending from the third tapered region to output a minor portion of the optical signal, the second output waveguide being parallel to the first output waveguide;

wherein the first waveguide, the first and second tapered regions, the input waveguide, and first output waveguide are collinear;
wherein the second waveguide, the third tapered region, and the second output waveguide are collinear; and
wherein a ratio of the second width to the first width is less than 1.

14. The optical splitter of claim 13 wherein the first length, the second length, and the predetermined distance are configured to allow evanescent coupling of the optical signal in the first waveguide into the second waveguide with a predetermined splitting ratio, the minor portion and the major portion being determined by the predetermined splitting ratio.

15. An optical splitter comprising:
a silicon-on-insulator substrate having a cladding layer;
a first waveguide of a first width and a first length buried in the cladding layer;
a second waveguide of a second width and a second length buried in the cladding layer, the second waveguide disposed parallel to the first waveguide and separated from the first waveguide by a predetermined distance;
a first tapered region extending from a first end of the first waveguide;
an input waveguide of a third width buried in the cladding layer to receive an optical signal, the input waveguide extending from the first tapered region, the third width being less than at least one of the first and second widths;
a second tapered region extending from a second end of the first waveguide;
a first output waveguide of a fourth width buried in the cladding layer, the first output waveguide extending from the second tapered region to output a major portion of the optical signal, the fourth width being less than at least one of the first and second widths;
a third tapered region extending from a first end of the second waveguide, the third tapered region being on the same side as the second tapered region;
a second output waveguide of the fourth width buried in the cladding layer, the second output waveguide extending from the third tapered region to output a first minor portion of the optical signal, the second output waveguide being parallel to the first output waveguide;
a fourth tapered region extending from a second end of the second waveguide, the fourth tapered region being on the same side as the first tapered region; and
a third output waveguide of the fourth width buried in the cladding layer, the third output waveguide extending from the fourth tapered region to output a second minor portion of the optical signal, the third output waveguide being parallel to the input waveguide;

wherein the first waveguide, the first and second tapered regions, the input waveguide, and first output waveguide are collinear;
wherein the second waveguide, the third and fourth tapered regions, and the second and third output waveguides are collinear; and
wherein a ratio of the second width to the first width is less than 1.

16. The optical splitter of claim 15 wherein the first length, the second length, and the predetermined distance are configured to allow evanescent coupling of the optical signal in the first waveguide into the second waveguide with a predetermined splitting ratio over a broadband of wavelengths in C band or O band, the first and second minor portions and the major portion being determined by the predetermined splitting ratio.

\* \* \* \* \*